May 22, 1923.
F. H. RAUH
1,456,339
MOVABLE JAWED TOOL
Filed Aug. 30, 1922
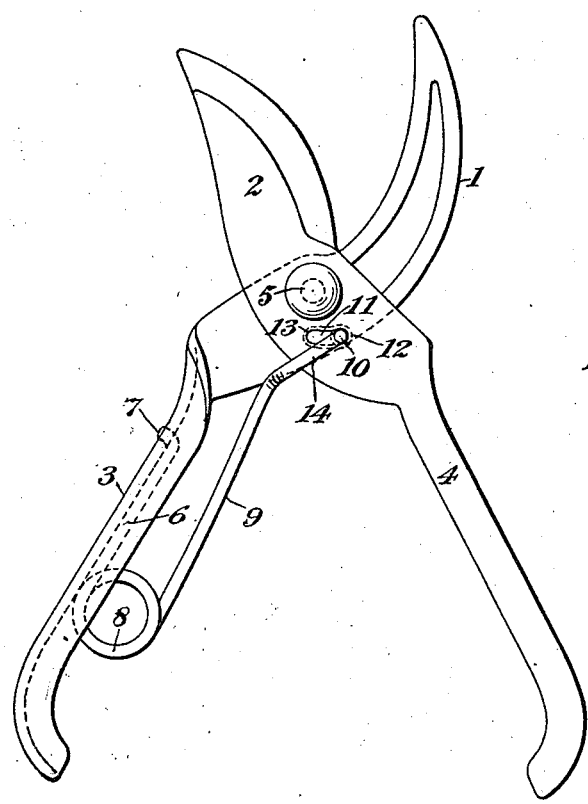
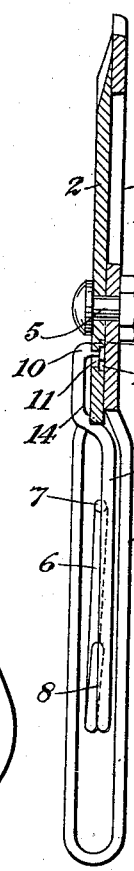
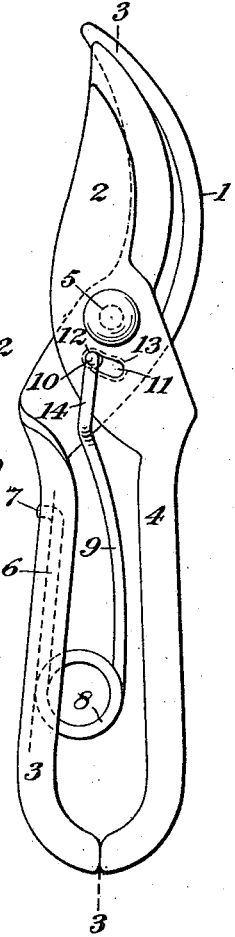
Frederic H. Rauh, Inventor,
By his Attorney Andrew Wilson.

Patented May 22, 1923.

1,456,339

UNITED STATES PATENT OFFICE.

FREDERIC H. RAUH, OF SOUTH ORANGE, NEW JERSEY.

MOVABLE-JAWED TOOL.

Application filed August 30, 1922. Serial No. 585,119.

*To all whom it may concern:*

Be it known that I, FREDERIC H. RAUH, a citizen of the United States, residing at South Orange, Essex County, New Jersey, have invented certain new and useful Improvements in Movable-Jawed Tools, of which the following is a specification.

My invention relates to tools provided with means by which cooperating jaws may be opened and closed, my improvements being particularly directed to means whereby the jaws may be automatically opened, but which may, optionally, be made to serve the purpose of locking them in a closed position, thus making the same element act as a spreader and also as a lock or keeper.

The particular uses to which the opening and closing jaws may be put may be considerably varied.

In the drawings I have shown my invention as embodied in pruning shears. But this is to be understood as illustrating a typical but not an exclusive example of its use.

In the drawings, in all the figures of which similar parts are designated by similar reference numerals, Fig. 1 is a plan view of a pair of pruning shears in which my invention is embodied, the shears being shown opened; Fig. 2 is a similar view showing the shears closed; and Fig. 3 is a longitudinal sectional view, taken on the line 3—3 of Fig. 2 looking to the left.

The hook 1 and blade 2, members of the shears, are of any suitable form, for instance as shown, and are provided with appropriate actuating means, such as the conventional handles 3, 4 coupled by a suitable pivot 5, so that when the handles are brought together the blade and hook will be closed upon each other.

A spring member 6 is secured by one end, as 7, to the handle 3, and is provided with an intermediate portion, such as a coil 8, of sufficient elasticity, in connection with the shanks of the spring, to provide for the requisite expansion and contraction to throw the jaws open or to hold them closed as may be preferred.

From the loop 8, one end 9 of the shank of the spring is extended up to a point near and below the pivot 5, and is provided with an offset end 10 which is passed through a cam slot 11 in the handle 4, the end being held in the slot by suitable means, such as a flange 12 accommodated in a rabbet 13 around the inner edge of the slot 11.

The spring 9 is so proportioned and constructed that its normal tendency is to press its end 10 out toward the outer end of the slot 11 and to thereby throw the handles 3, 4 apart, as shown in Fig. 1, and, also, so that, if the handles are closed together, against the force of the spring, the spring, while compressed laterally, and, somewhat longitudinally, will still keep its end 10 in the outer end of the slot and throw the handles apart whenever they are left free to respond to its action.

If, however, after or as the handles are closed, the end 10 of the spring is forced over to the opposite or inner end of the slot 11, which may be done by applying pressure to the spring, preferably near its end, as at 14, the end 10 of the spring will be carried past the dead center between the pivot 5 and the line of recoil of the spring, and the force of the spring will be exerted to keep the handles and jaws closed instead of throwing them apart, the parts remaining in this position until superior force changes their relations.

With the spring thus disposed, if the handles 3 and 4 are drawn apart, the slot 11 will form an obtuse angle with the line of thrust of the spring, and the end 10 of the spring will travel out to the outer end of the slot as shown in Fig. 1, remaining there, in the ordinary use of the shears, until again thrown into locking position as above explained.

By means of my improvements I am enabled to make a single element, as the spring 6, perform the dual function of opening the tool in the usual manner, or, optionally, of locking it closed, thus reducing the number of parts to a minimum, avoiding the use of a separate keeper or lock, detached or otherwise, and securing a simple, compact and efficient tool which may be unlocked by the mere movement of opening it.

It will be understood that details of the embodiment of my invention may be modified or varied, as by the use of equivalents or the like, without departing from the spirit of my invention or the scope of the claims.

Having thus described my invention, what I claim, and desire to secure by Letters Patent of the United States is:—

1. The combination, with a tool embodying cooperating cutting elements, of a compressible spring having one portion in fixed relation to one cutting element and another portion in adjustable relation to the other cutting element, for normally separating such cutting elements and for optionally preventing such separation.

2. The combination, with a tool embodying cooperating cutting elements and a pivot uniting such elements, of spring means having a fixed relation to one of the cutting elements and an adjustable relation to the other of such elements and normally exerting force in one direction relative to said pivot and being adjustable to optionally exert its force in another direction.

3. The combination, with a tool embodying cooperating cutting elements and a pivot uniting such elements, of spring means having a fixed relation to one of the cutting elements and an adjustable relation to the other of such elements and normally exerting force in one direction relative to said pivot and being adjustable to optionally exert its force in the opposite direction.

4. The combination, with a tool embodying pivoted, cooperating cutting elements, of spring means having a fixed relation to one cutting element and an adjustable relation to the other cutting element whereby the direction of its influence upon the pivoted elements may be optionally changed.

5. The combination, with a tool embodying pivoted, cooperating cutting elements, of spring means having a fixed relation to one cutting element and an adjustable cam relation to the other cutting element whereby the direction of its influence upon the pivoted elements may be optionally changed.

6. The combination, with a tool embodying pivoted, cooperating cutting elements carried by handles one of which is provided with a cam slot, of a spring having one portion slidably mounted in said cam slot and another portion fixedly attached to the other handle, the spring being optionally adjustable in said cam slot to reverse the direction of its line of influence on said handles.

FREDERIC H. RAUH.